United States Patent
Ishida et al.

(10) Patent No.: US 9,831,017 B2
(45) Date of Patent: Nov. 28, 2017

(54) EXTERIOR MEMBER MOUNTING METHOD

(71) Applicant: Yazaki Corporation, Minato-ku, Tokyo (JP)

(72) Inventors: Takafumi Ishida, Makinohara (JP); Koji Nishina, Makinohara (JP); Takaaki Yanagihashi, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 170 days.

(21) Appl. No.: 14/818,513

(22) Filed: Aug. 5, 2015

(65) Prior Publication Data
US 2016/0056619 A1 Feb. 25, 2016

(30) Foreign Application Priority Data
Aug. 19, 2014 (JP) .................................. 2014-166784

(51) Int. Cl.
*H01R 43/00* (2006.01)
*H01B 13/012* (2006.01)
*H02G 3/04* (2006.01)

(52) U.S. Cl.
CPC ..... *H01B 13/01281* (2013.01); *H02G 3/0462* (2013.01); *Y10T 29/4921* (2015.01); *Y10T 29/49117* (2015.01)

(58) Field of Classification Search
CPC ......... Y10T 29/49117; Y10T 29/49155; Y10T 29/4921; Y10T 428/24; Y10T 428/25; Y10T 403/454
(Continued)

(56) References Cited

U.S. PATENT DOCUMENTS 4,424,627 A * 1/1984 Tarbox .................. H01B 7/368
174/112
6,710,262 B2 * 3/2004 Takada ............. H01B 13/01254
174/259
(Continued)

FOREIGN PATENT DOCUMENTS

CN 102711432 A 10/2012
CN 102948021 A 2/2013
(Continued)

OTHER PUBLICATIONS

Communication issued by the State Intellectual Property Office of P.R. China dated Aug. 28, 2017 in counterpart Chinese Patent Application No. 201510508473.7.

*Primary Examiner* — Thiem Phan
(74) *Attorney, Agent, or Firm* — Sughrue Mion, PLLC

(57) ABSTRACT

An exterior member attaching method includes four steps. In an exterior member loading step, an exterior member is loaded onto a base plate in a state where the electric wire regulation pins provided on the base plate pass through exterior member holes. In an electric wire loading step, the electric wire is placed on the exterior member along the electric wire regulation pins. In an exterior member temporary bonding step, the electric wire is nipped by temporarily bonding a second half of the exterior member on the movable temporary bonding portion to a first half of the exterior member on the base plate while pushing the electric wire regulation pins to the base plate side. In an exterior member actual bonding step, a bonding end edge is bonded by moving a bonding roller.

2 Claims, 8 Drawing Sheets

(58) Field of Classification Search
USPC .......... 29/825, 745, 755, 760, 846, 872, 877
See application file for complete search history.

(56) References Cited

U.S. PATENT DOCUMENTS

| | | |
|---|---|---|
| 2013/0075012 A1 | 3/2013 | Yamada |
| 2014/0111919 A1 | 4/2014 | Miyasaka et al. |
| 2015/0107748 A1 | 4/2015 | Suzuki |

FOREIGN PATENT DOCUMENTS

| | | |
|---|---|---|
| CN | 103769747 A | 5/2014 |
| JP | 2012-4606 A | 1/2012 |
| JP | 2012-99669 A | 5/2012 |
| JP | 2014-26760 A | 2/2014 |
| WO | 2014/017538 A1 | 1/2014 |

* cited by examiner

EXTERIOR MEMBER MOUNTING METHOD

BACKGROUND

The present invention relates to an exterior member mounting method and an exterior member attaching device.

An exterior member attaching device and an exterior member attaching method which can improve efficiency in the task of attaching an exterior member are known (refer to Patent Document 1).

As illustrated in FIG. 8, in the exterior member attaching method using an exterior member attaching device 501, first, in accordance with the size of electric wire 505 in a wire harness 503 and a sheet member 507 which is an exterior member, an appropriate through hole 511 is selected among a plurality of through holes 511 of a rotating arm 509 and a supporting rod 513 passes through the selected through hole 511. After this, the sheet member 507 is loaded and supported by one pair of supporting rods 513, including a first supporting portion 517 and a second supporting portion 519 of supporting means 515. The electric wire 505 is disposed along an adhesion surface of the sheet member 507, and the electric wire 505 is held by electric wire holding means 521 and electric wire holding means 523. Next, after rotating one pair of rotating arms 509 with a rotating mechanism and bending the sheet member 507 towards the first supporting portion 517, the rotating arm 509 is returned to an initial position. Following this, a pressing roller 527 of pressing means 525 is driven, and the pressing roller 527 which abuts against the sheet member 507 is rolled, and accordingly, the adhesion surfaces of the sheet member 507 are closely in contact with each other and adhere to each other.

Accordingly, since the pressing means 525 presses the sheet member 507 along the vicinity of the electric wire 505 and makes the adhesion surfaces adhere to each other, it is possible to strongly adhere the sheet member 507 in the vicinity of an electric wire part, and to prevent the covered electric wire 505 from being exposed.

[Patent Document 1] JP-A-2014-26760

SUMMARY

In an exterior member attaching method using the above-described exterior member attaching device 501 in the related art, when manually loading the electric wire 505 onto the sheet member 507, there is a possibility that a part of the electric wire 505 will protrude from a part of a main line due to the influence of slack in the electric wire. When a protruding portion 531 of the electric wire 505 overlaps with a bonding area 529 of the sheet member 507, there is a concern that the electric wire 505 will be crushed by the pressing roller 527.

In consideration of the above-described situation, an object of the present invention is to provide an exterior member attaching method and an exterior member attaching device which can prevent an electric wire from being crushed when being bonded to an exterior member.

The above-described object of the present invention is achieved by the following configuration.

(1) An exterior member attaching method, including: an exterior member loading step of loading a sheet-shaped exterior member onto a base plate on which a plurality of electric wire regulation pins are provided to freely advance and retreat in a direction along electric wire in a state where the electric wire regulation pins pass through exterior member holes; an electric wire loading step of placing the electric wire on the exterior member along the electric wire regulation pins which protrude from the exterior member; an exterior member temporary bonding step of nipping the electric wire by oscillating a movable temporary bonding portion which is linked to the base plate to be freely oscillated on a side opposite to the electric wire regulation pins by nipping the electric wire, and by temporarily bonding a second half of the exterior member on the movable temporary bonding portion to a first half of the exterior member on the base plate while pushing the electric wire regulation pins to the base plate side; and an exterior member actual bonding step of bonding a bonding end edge by moving a bonding roller along the electric wire between the temporarily bonded exterior members.

(2) The exterior member attaching method according to (1), in which, in the exterior member temporary bonding step, by moving an oscillating axis of the movable temporary bonding portion, the second half of the exterior member on the movable temporary bonding portion is fed to an oscillation tip end side, and the bonding end edge between the exterior members is arranged.

(3) An exterior member attaching device, including: a base plate on which a substantial half of a sheet-shaped exterior member is loaded in a state where a plurality of electric wire regulation pins pass through exterior member holes, on a base loading surface on which the plurality of electric wire regulation pins are provided to protrude to freely advance and retreat in a direction along an electric wire; a movable temporary bonding portion which stacks the exterior members onto each other by being linked to the base plate to be stackable by an oscillating axis, and nipping the electric wire which is loaded along the electric wire regulation pins by a substantial half of the exterior member on the base plate and the second half of the exterior member which is loaded onto a movable loading surface while the second half of the exterior member is loaded onto the movable loading surface and pushes the electric wire regulation pins by oscillation; and a bonding roller which bonds a bonding end edge along the electric wire between the exterior members bonded by the base plate and the movable temporary bonding portion.

(4) The exterior member attaching device according to (3), in which the oscillating axis is supported to be freely movable in a direction which is orthogonal to the axial line to feed the second half of the exterior member on the movable temporary bonding portion to an oscillation tip end side.

DETAILED DESCRIPTION OF EXEMPLIFIED EMBODIMENTS

Hereinafter, an embodiment according to the present invention will be described with reference to the drawings.

Figure 1:
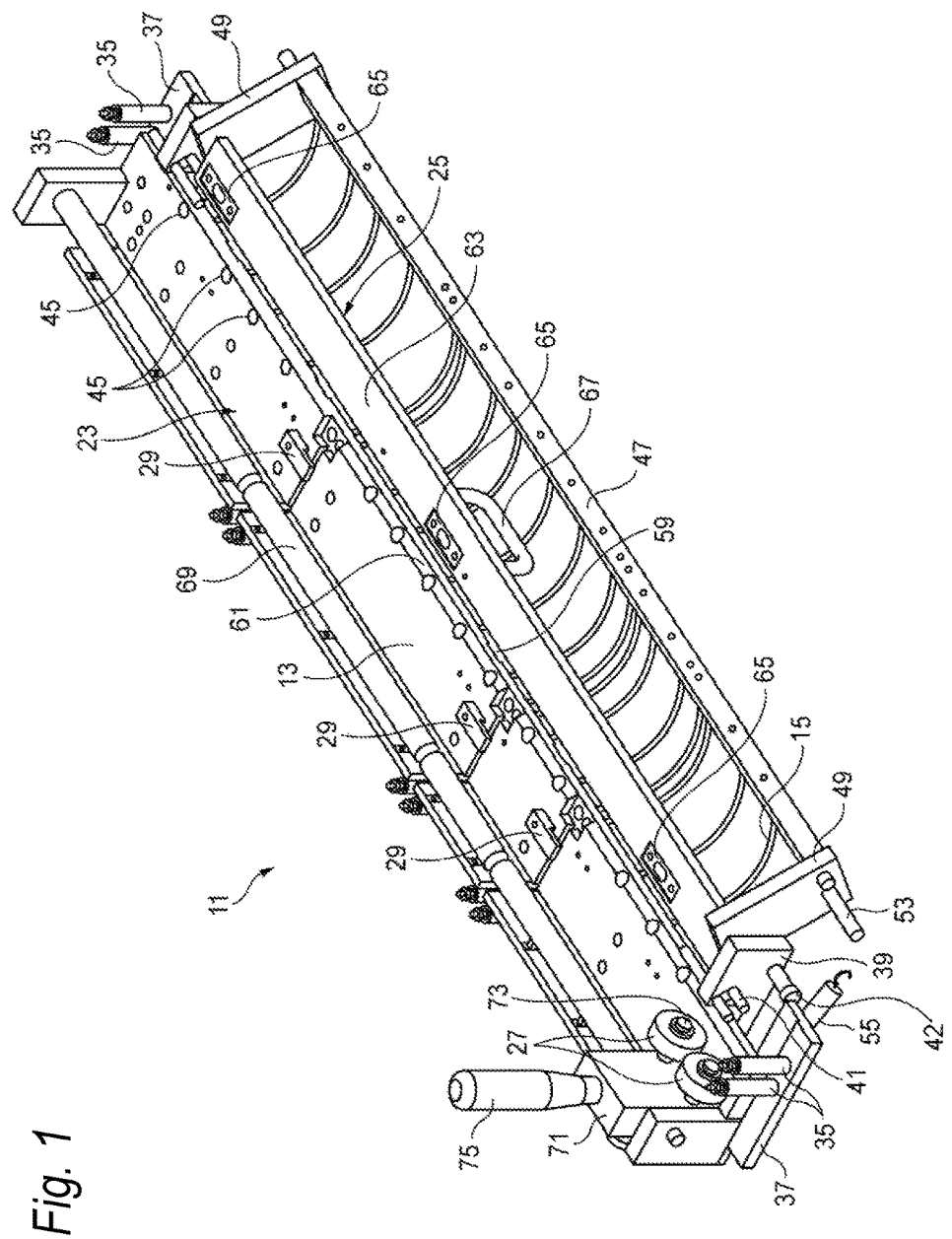
FIG. 1 is a perspective view of an exterior member attaching device according to an embodiment of the present invention.

An exterior member attaching device 11 according to one embodiment of the present invention in FIG. 1 is a device for attaching a sheet-shaped exterior member 19 which covers an electric wire 17, to the electric wire 17 in a wire harness during a step of manufacturing the wire harness.

The exterior member 19 is formed in the shape of a sheet having a protection layer and an adhesion layer, is folded in half while considering an adhesion surface as an inner side and an exterior surface as an outer side. The exterior member 19 protects the electric wire 17 which is nipped between sheet members as the adhesion surfaces are adhered to each other. In addition, a plurality of clamps 21 (refer to FIG. 3) which protrudes from the exterior surface is attached to the exterior member 19 in advance. The wire harness can be attached to a vehicle body as the clamps 21 are engaged with the vehicle body or the like which is a fixed body.

In addition, in the exterior member 19, it is possible to use a self-adhesive sheet which can be bonded by simply matching adhesive surfaces (rear surfaces) thereof to each other. The self-adhesive sheet can be simply stacked by matching the adhesive surfaces to each other without using glue or a binding tape. Furthermore, a special adhesive layer (adhesive surface) does not stick to the wire harness or the fingers of a worker, and assembly workability of the self-adhesive tape does not deteriorate. In the self-adhesive sheet, a front surface material is laminated on a front surface of a sheet base material which is made of a polypropylene (PP) foaming material, and the special adhesive layer is laminated on the rear surface. A kraft paper sheet, a linerboard, a polyethylene-terephthalate (PET) film, a PP film, or a non-woven fabric can be used as the front surface material. Tensile strength in a vertical direction is 49 N/cm of width, and tensile strength in a horizontal direction is 23 N/cm of width (based on JIS K-6767). Tearing strength in a vertical direction is 7.8 N, and tearing strength in a horizontal direction is 6.8 N (based on JIS K-6767). A moisture vapor transmission rate is 0.0052 g/cm2·24 hrs (FS-101B). An initial adhesive force is 2.5 N/cm of width (T-type peeling test). As the self-adhesive sheet, it is possible to use Cro-nel™, for example. In addition, the exterior member 19 is not limited to the above-described self-adhesive sheet, and it is possible to use the self-adhesive sheet in which the special adhesive layer is laminated on one surface of a general sheet base material which does not include the foaming material, or a known adhesive sheet in which an adhesive is partially or completely coated on at least one surface of the sheet base material.

Figure 2:
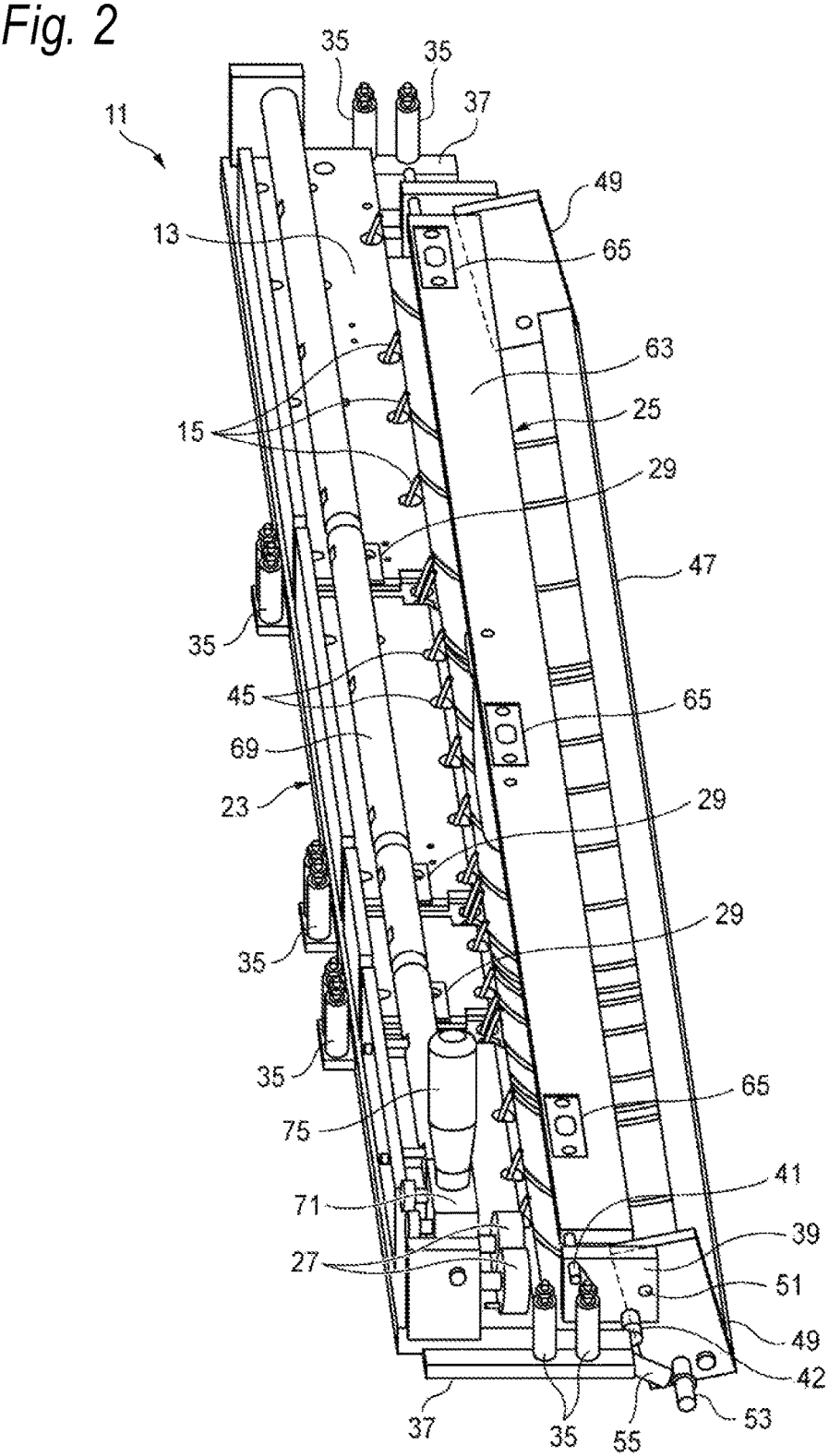
FIG. 2 is a perspective view of the exterior member attaching device illustrated in FIG. 1 in which electric wire regulation pins protrude up to a set position from a base loading surface.

As illustrated in FIGS. 1 and 2, the exterior member attaching device 11 according to the embodiment includes a base plate 23, a movable temporary bonding portion 25, and a bonding roller 27.

The base plate 23 is formed as a long rectangular wiring board along a longitudinal direction of the wire harness. In the base plate 23, an upper surface becomes a base loading surface 13. The sheet member positioning member 29 for positioning the sheet member is attached to the base loading surface 13 at a plurality of locations. In addition, in the base plate 23, a plurality of electric wire holding portions 35 for holding a branch line 33 that is branched from a main line 31 which is supported by the base plate 23 are provided. The electric wire holding portion 35 is made of one pair of columnar bodies which can clip the branch line 33. Base poles 37 are fixed to each of single pairs of short side portions of the base plate 23. In each of the base poles 37, the electric wire holding portions 35 which support both ends of the wire harness stand in the longitudinal direction.

Supporting board portions 39 are fixed to the lower surfaces of the one pair of short side portions of the base plate 23. The supporting board portion 39 supports both sides of the movable temporary bonding portion 25 to be freely oscillated by an oscillating axis 41. The oscillating axis 41 is supported to be freely movable in a direction which is orthogonal to an axial line as being supported by a long hole 43 (refer to FIG. 6) which is formed in the supporting board portion 39.

On the base loading surface 13, a plurality of pin leading-out holes 45 are punched along the main line 31 which binds the plurality of electric wires 17 together. In each pin leading-out hole 45, electric wire regulation pins 15 which are bent in the shape of an arc are inserted to freely advance and retreat. In other words, on the base plate 23, the plurality of electric wire regulation pins 15 are provided to protrude to freely advance and retreat from the base loading surface 13 in a direction along the main line 31. A base end portion of the electric wire regulation pin 15 is fixed by a pin fixing pier 47. When the branch line 33 is branched to the wire harness, the electric wire regulation pins 15 are disposed at one pair of predetermined intervals at a position which nips the branch line 33. Accordingly, looseness of the electric wire 17 of a branched portion in which the branch line 33 is branched from the main line 31 is effectively prevented.

Rotation side boards 49 are fixed to both ends of the pin fixing pier 47. Each rotation side board 49 is supported to be freely rotated by a rotation axis 51 on the above-described supporting board portion 39. A movable pin handle 53 is attached to one rotation side board 49.

The rotation side board 49 biases the electric wire regulation pin 15 to rotate in a direction while protruding from the base loading surface 13 by a tension spring 55 which is stretched between the base plate 23 and the rotation side board 49. In addition, an amount of protrusion of the electric wire regulation pin 15 which is biased to rotate is regulated at a set position (positon in FIG. 2) at which a tip end of the electric wire regulation pin 15 slightly protrudes from the pin leading-out hole 45 as a stopper 42 abuts against a side edge of the rotation side board 49. In addition, the rotation side board 49 is rotated by a biasing force of the tension spring 55 and all of the electric wire regulation pins 15 protrude from the pin leading-out hole 45 as the regulation of the stopper 42 is released.

In the exterior member 19, exterior member holes 57 are punched through which each electric wire regulation pin 15 passes. On the base loading surface 13 of the base plate 23, a substantial half 19a (a first half) of the exterior member 19 is loaded in a state where the electric wire regulation pins 15 pass through the exterior member holes 57.

In the exterior member attaching device 11, a base loading surface cut-out portion 61 in which chamfering is performed is formed in a base loading surface edge portion 59 which is adjacent to the movable temporary bonding portion 25.

The movable temporary bonding portion 25 is linked to be stackable to the base plate 23 to the long hole 43 which is formed in the supporting board portion 39 while the oscillating axis 41 is supported. The upper surface of the movable temporary bonding portion 25 becomes a movable loading surface 63. On the movable loading surface 63, a clamp avoiding portion 65 for avoiding interference of locking hooks of the plurality of clamps 21 which are punched from the exterior surface attached to the exterior member 19 is provided. The movable temporary bonding portion 25 has one common surface with the base plate 23 as being disposed in an opened state. In other words, the base loading surface 13 and the movable loading surface 63 are planes. On the base loading surface 13, the substantial half 19a (the first half) of the exterior member 19 is loaded, and the other substantial half 19b (a second half) of the exterior member 19 is loaded onto the movable loading surface 63.

After the second half 19b of the exterior member 19 is loaded onto the movable loading surface 63 of the movable temporary bonding portion 25, when the regulation of the stopper 42 is released and all of the electric wire regulation pins 15 protrude from the pin leading-out hole 45, the tip end of the electric wire regulation pin 15 abuts against the exterior member 19 which is loaded onto the movable loading surface 63. When the movable temporary bonding portion 25 is oscillated in a direction of being stacked on the base plate 23, the electric wire regulation pins 15 are pushed into the pin leading-out holes 45 against a biasing force of the tension spring 55 (refer to FIG. 6). Accordingly, the movable temporary bonding portion 25 nips the main line 31 which is loaded along the electric wire regulation pin 15 by the first half 19a of the exterior member 19 on the base plate 23 and the second half 19b of the exterior member 19 which is loaded onto the movable loading surface 63, and stacks the exterior members on each other. In an edge portion on an oscillation tip end side of the movable temporary bonding portion 25, an oscillation handle 67 is provided.

When the movable temporary bonding portion 25 is oscillated in a direction of being stacked on the base plate 23, the oscillating axis 41 is supported to be freely movable in the direction which is orthogonal to the axial line by the long hole 43 so as to feed the second half 19b of the exterior member 19 on the movable loading surface 63 to the oscillation tip end side.

On the base plate 23, a roller supporting rail 69 which extends along the longitudinal direction of the base plate 23 is provided on a side opposite to the movable temporary bonding portion 25. In the roller supporting rail 69, a moving member 71 is guided to be freely slid. In the moving member 71, one pair of bonding rollers 27 which is supported to be freely rotated by a roller axis 73 in a direction which is orthogonal to the roller supporting rail 69, and in a direction which is parallel to the base loading surface 13 are provided. In the moving member 71, a roller slide handle 75 is provided. The movable temporary bonding portion 25 is oscillated with respect to the base plate 23, and the bonding roller 27 bonds a bonding end edge 77 (refer to FIG. 7) along the electric wire 17 between the exterior members which are stacked by the base plate 23 and the movable temporary bonding portion 25.

Next, an exterior member attaching method using the exterior member attaching device 11 configured as described above will be described.

The exterior member attaching method according to the embodiment includes an exterior member loading step, an electric wire loading step, an exterior member temporary bonding step, and an exterior member actual bonding step.

Figure 3:
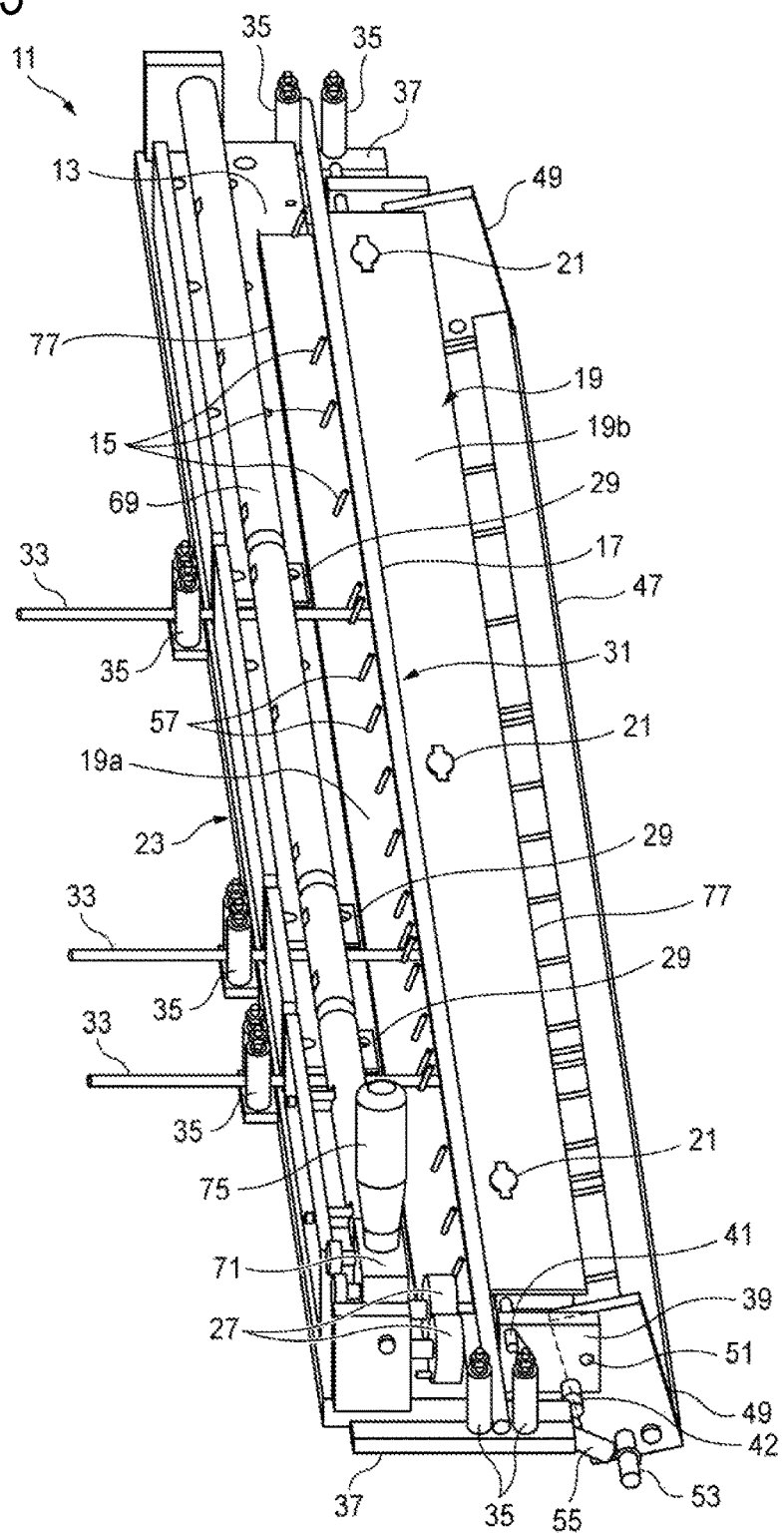
FIG. 3 is a view illustrating an operation of an exterior member loading step.

In the exterior member loading step, as illustrated in FIG. 3, the exterior member 19 is loaded across the base loading surface 13 of the base plate 23 and the movable loading surface 63 of the movable temporary bonding portion 25. The exterior member 19 is loaded while the adhesive surface becomes the upper surface thereof. When loading the exterior member 19, the tip end of the electric wire regulation pin 15 which is regulated by the stopper 42 slightly protrudes from the base loading surface 13 of the base plate 23. The exterior member 19 is loaded by making the electric wire regulation pins 15 pass through the exterior member holes 57.

In the electric wire loading process, the main line 31 is placed on the exterior member 19 along the electric wire regulation pin 15 which slightly protrudes from the exterior member hole 57 of the exterior member 19. Both sides of the main line 31 are held by the electric wire holding portion 35. When the branch line 33 is branched from the main line 31 of the wire harness, the branch line 33 which is branched from the main line 31 is held by the predetermined electric wire holding portion 35 which is provided on the base plate 23.

Figure 4:
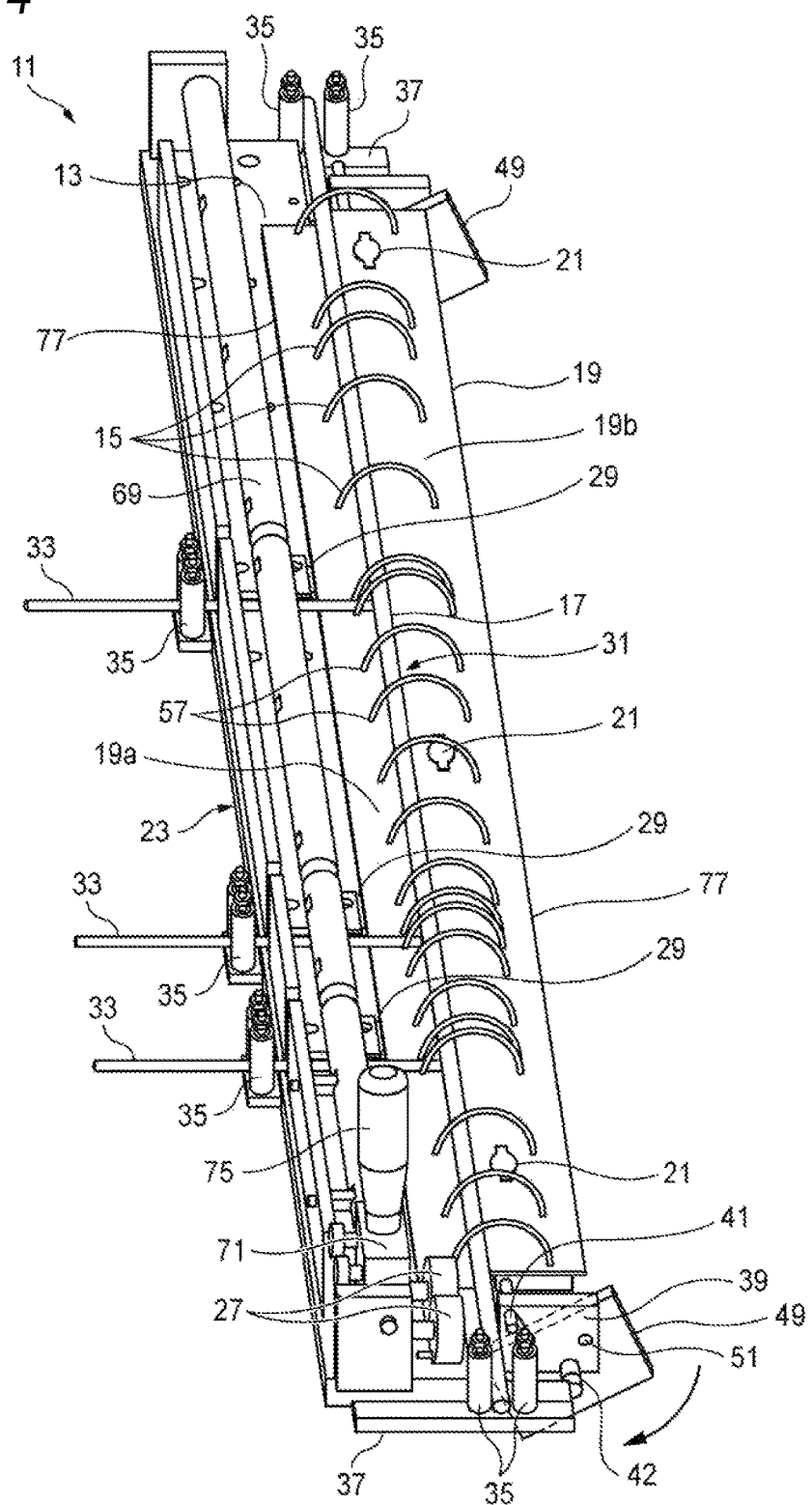
FIG. 4 is a view illustrating an operation of an electric wire loading step.
Figure 5:
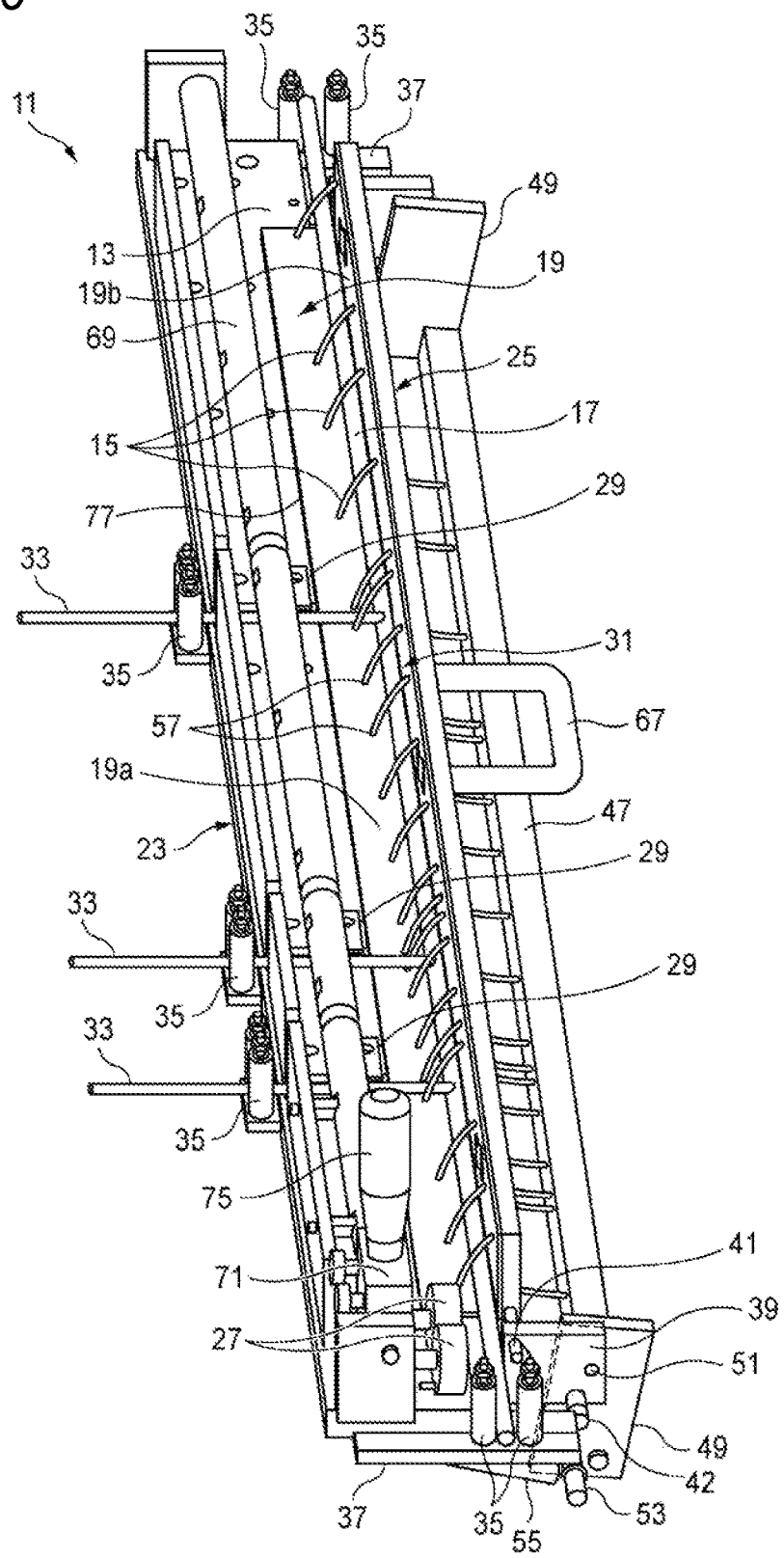
FIG. 5 is a view illustrating an operation of an exterior member temporary bonding step.
Figure 6:
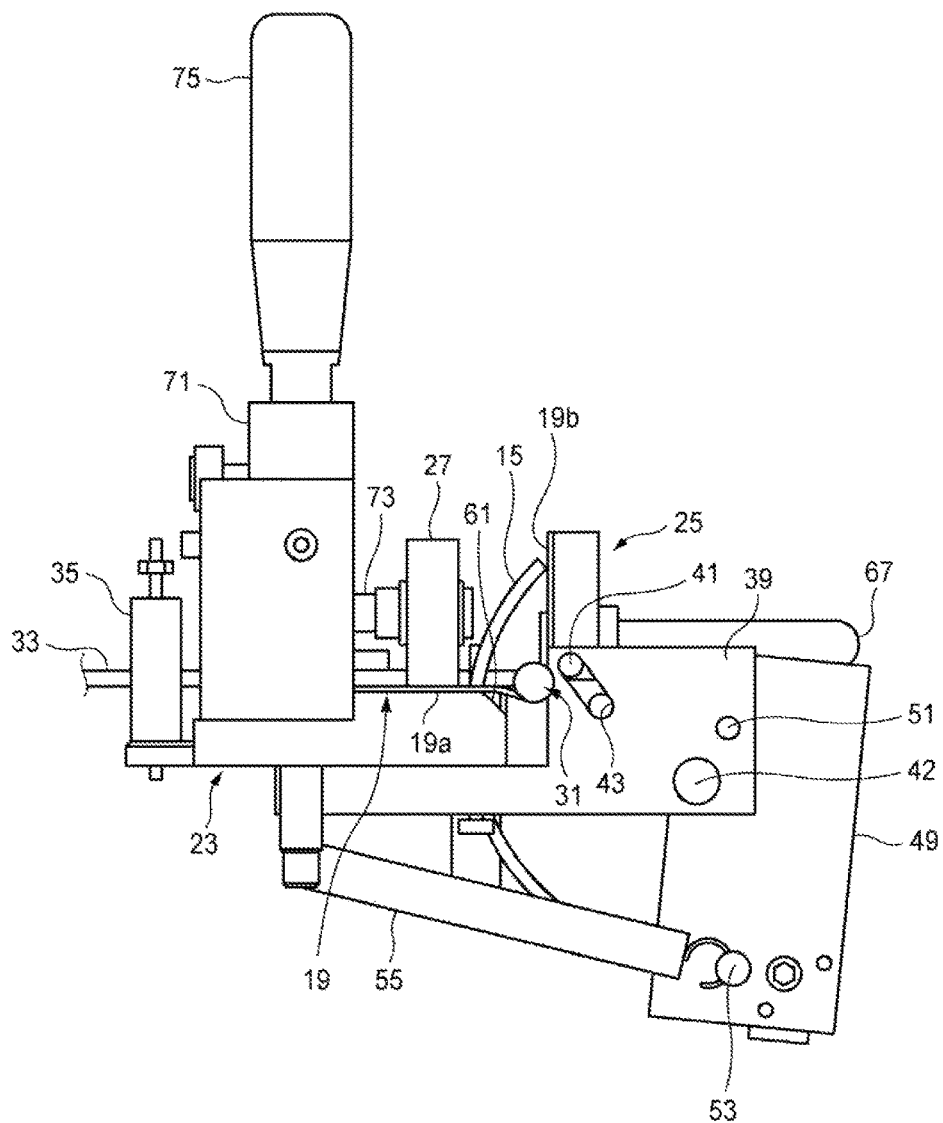
FIG. 6 is a side view of the exterior member attaching device illustrated in FIG. 5.

In the exterior member temporary bonding step, as illustrated in FIGS. 5 and 6, the movable temporary bonding portion 25 which is linked to be freely oscillated to the base plate 23 on the side opposite to the electric wire regulation pin 15 by nipping the main line 31 is oscillated to the base plate 23 side. Before rotating the movable temporary bonding portion 25, the regulation of the stopper 42 is released and all of the electric wire regulation pins 15 protrude (refer to FIG. 4). Here, the tip end of the electric wire regulation pin 15 protrudes towards the movable loading surface 63 of the movable temporary bonding portion 25 and abuts against the exterior member 19. The exterior member 19 which is loaded onto the movable loading surface 63 is pressed to the tip end of the electric wire regulation pin 15. Accordingly, even when the movable temporary bonding portion 25 is rotated by the oscillation, the exterior member 19 is held without being separated from the movable loading surface 63. As the movable temporary bonding portion 25 is oscillated, the main line 31 and the branch line 33 are nipped by temporarily bonding the second half 19b of the exterior member 19 on the movable loading surface 63 to the first half 19a of the exterior member 19 on the base loading surface 13 while pushing the electric wire regulation pins 15 to the base plate 23 side.

In the exterior member temporary bonding step, in the movable temporary bonding portion 25, the oscillating axis 41 is moved along the long hole 43 (refer to FIG. 6). Accordingly, the second half 19b of the exterior member 19 on the movable temporary bonding portion 25 is fed to the oscillation tip end side, and as illustrated in FIG. 7, the bonding end edge 77 between the exterior members is arranged.

Figure 7:
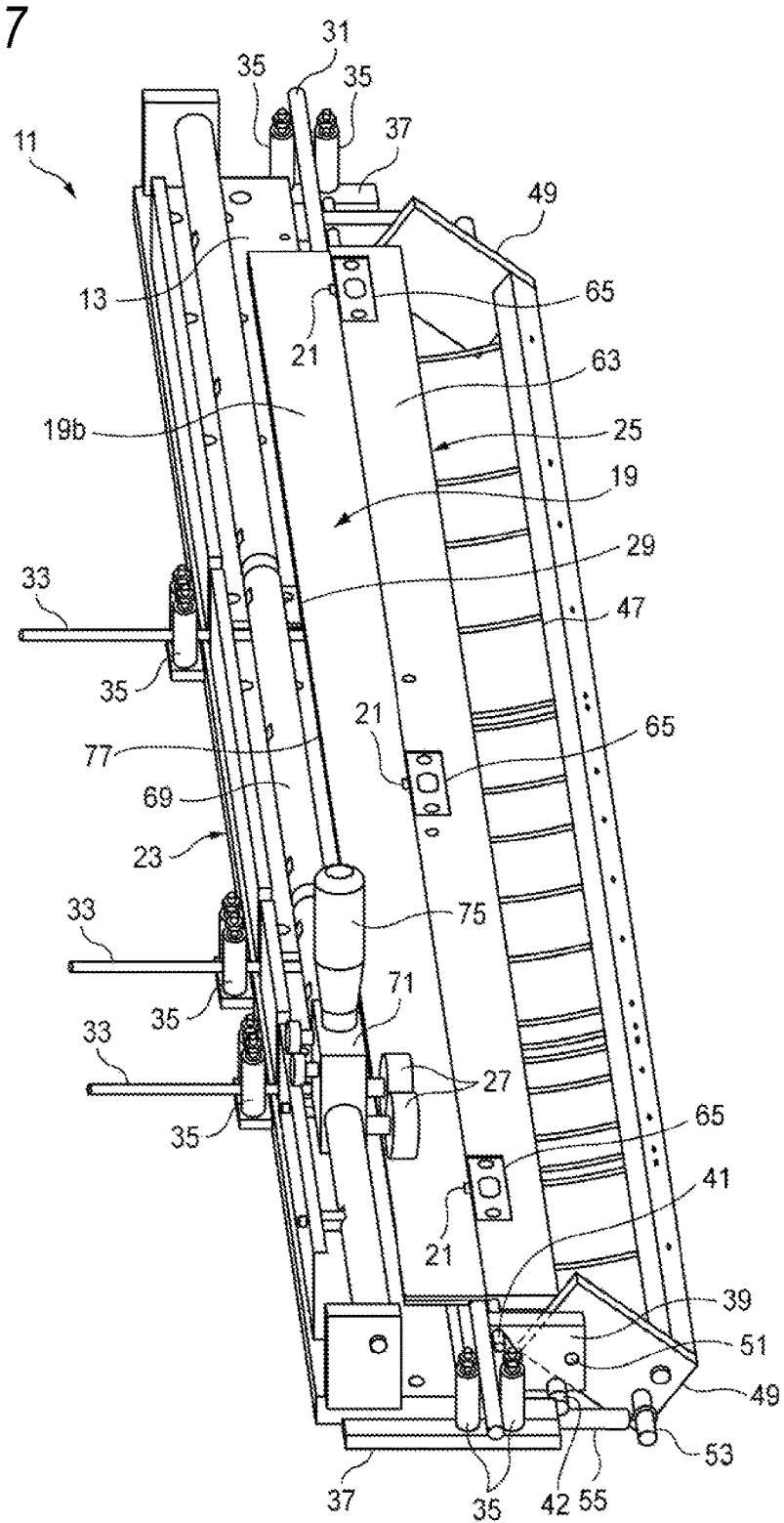
FIG. 7 is a view illustrating the operation of the exterior member temporary bonding step.
Figure 8:
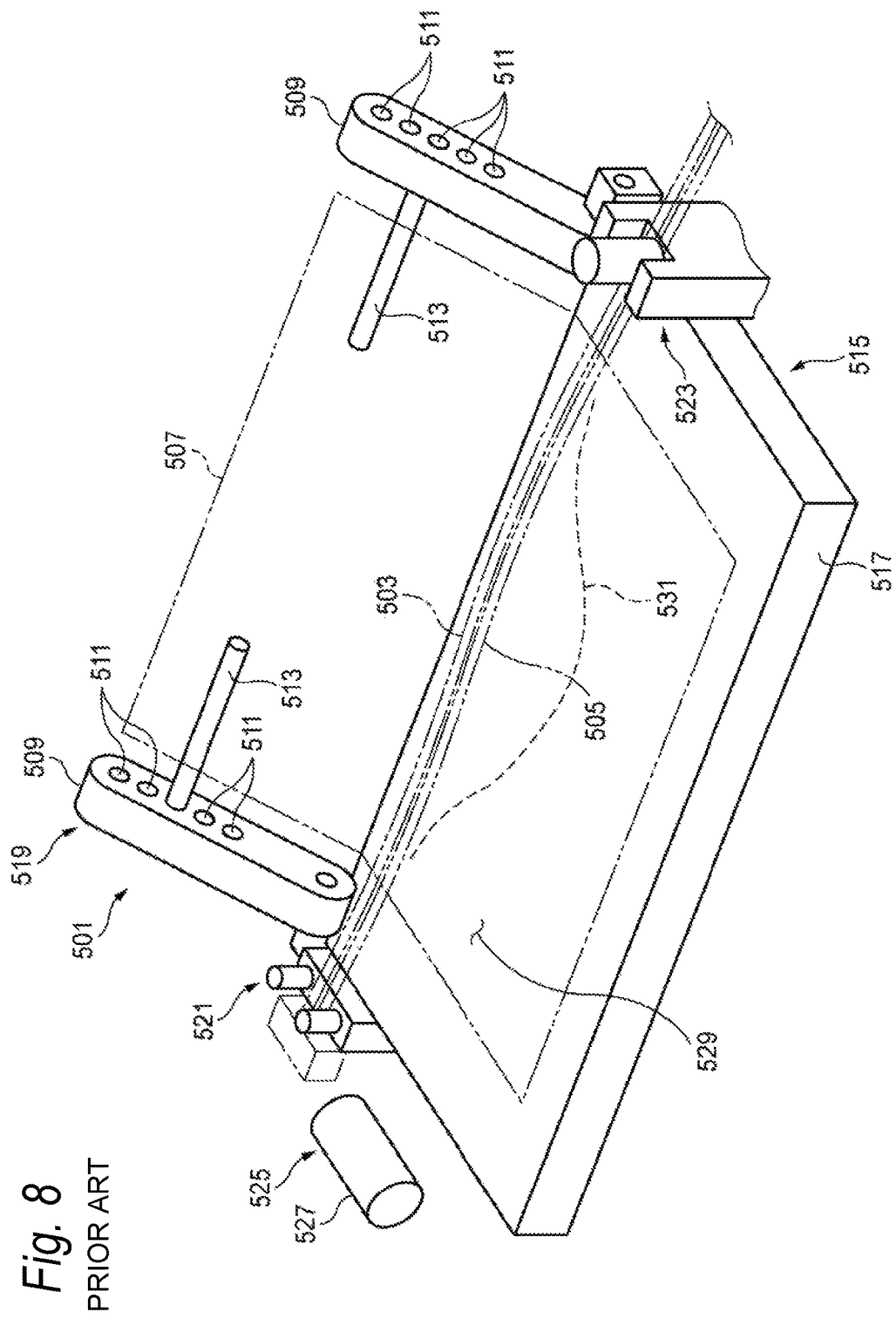
FIG. 8 is a perspective view of an exterior member attaching device in the related art.

In the exterior member actual bonding step, as illustrated in FIG. 7, the bonding end edge 77 along the main line 31 between the exterior members which are temporarily bonded is bonded by the bonding roller 27. Accordingly, manufacturing of the wire harness which covers the main line 31 and the branch line 33 with the exterior member 19 is completed.

Next, the exterior member attaching device 11 which has the above-described configuration, and an operation of the exterior member attaching method will be described.

In the exterior member attaching device 11 according to the embodiment, the movable temporary bonding portion 25 is linked to be freely oscillated by the oscillating axis 41 with respect to the base plate 23. In other words, as the movable temporary bonding portion 25 is oscillated, the movable loading surface 63 of the movable temporary bonding portion 25 matches the base loading surface 13 of the base plate 23. On the base loading surface 13, the plurality of electric wire regulation pins 15 protrude to freely advance and retreat along the main line 31.

The sheet-shaped exterior member 19 is loaded across the base loading surface 13 and the movable loading surface 63. At this time, the electric wire regulation pins 15 are inserted through the exterior member holes 57 which are punched in the exterior member 19. The main line 31 is loaded onto the exterior member 19 along the electric wire regulation pins 15. As the movable temporary bonding portion 25 on the side opposite to the electric wire regulation pin 15 nipping the main line 31 is oscillated, the electric wire regulation pins 15 which protrude from the base loading surface 13 are pushed to the base loading surface 13 side. When pushing of the electric wire regulation pin 15 is completed, at the same time, the second half 19b of the exterior member 19 on the movable loading surface 63 is stacked on the first half 19a of the exterior member 19 of the base loading surface 13. Accordingly, the main line 31 is nipped by the exterior member 19.

At this time, the main line 31 is guided by the electric wire regulation pins 15 which are in the middle of being pushed right before being nipped by the exterior member 19, and the movement thereof is regulated. As a result, protrusion of the main line 31 to a bonding area 79 (refer to FIG. 5) is not generated.

In addition, in the exterior member attaching device 11, when the movable temporary bonding portion 25 is oscillated, and the second half 19b of the exterior member 19 on the movable loading surface 63 is stacked on the first half 19a of the exterior member 19 on the base loading surface 13, the movable temporary bonding portion 25 is moved to the oscillation tip end side as the oscillating axis 41 moves. While being covered along the outer circumference of the main line 31, the second half 19b of the exterior member 19 on the movable loading surface side of which the length up to the bonding end edge 77 is shortened is fed to the oscillation tip end side. Accordingly, the bonding end edge 77 of the base loading surface 13 and the bonding end edge 77 of the movable loading surface 63 are arranged to match each other.

In addition, in the exterior member attaching device 11, the base loading surface cut-out portion 61 is provided in the base loading surface edge portion 59 of the base plate 23. Accordingly, when the movable temporary bonding portion 25 is oscillated and the exterior member 19 wraps around the main line 31, since the main line 31 slightly moves downward, and the center thereof substantially matches the base loading surface 13, it becomes easy to arrange the bonding end edge 77.

In the exterior member attaching method according to the embodiment, the sheet-shaped exterior member 19 is loaded across the base loading surface 13 of the base plate 23 and the movable loading surface 63 of the movable temporary bonding portion 25. The plurality of electric wire regulation pins 15 protrude to freely advance and retreat along the electric wire 17 from the base loading surface 13. When the exterior member 19 is loaded onto the base loading surface 13, the electric wire regulation pins 15 pass through the plurality of punched exterior member holes 57, and the exterior member 19 is loaded onto the base loading surface 13. In addition, on the exterior member 19, the main line 31 is disposed along the electric wire regulation pin 15.

When the main line 31 is nipped and the movable temporary bonding portion 25 which is positioned on the side opposite to the electric wire regulation pin 15 is oscillated, the second half 19b of the exterior member 19 which is loaded onto the movable loading surface 63 overlaps with the first half 19b of the exterior member 19 which is loaded onto the base loading surface 13. At this time, protrusion of the main line 31 is regulated by the movement or looseness in the electric wire regulation pin 15. Accordingly, the main line 31 does not protrude to the bonding area 79 of the exterior member 19. In the exterior member 19 which temporarily bonds the main line 31, the bonding area 79 which does not protrude in the main line 31 is bonded by the bonding roller 27.

In addition, in the exterior member attaching method of the embodiment, when the movable temporary bonding portion 25 is oscillated, the oscillating axis 41 of the movable temporary bonding portion 25 is moved to the oscillation tip end side. The second half 19b of the exterior member 19 which is loaded onto the movable loading surface 63 of the movable temporary bonding portion 25 is moved to the oscillation tip end side as the oscillating axis 41 moves. As a result, while being covered along the outer circumference of the main line 31, an extra length of the second half 19b of the exterior member 19 on the movable loading surface 63 side of which the length up to the bonding end edge 77 is shortened, is generated on the oscillation tip end side as the second half 19b is fed to the oscillation tip end side. Accordingly, the bonding end edge 77 of the base loading surface 13 and the bonding end edge 77 of the movable loading surface 63 are arranged to match each other.

Therefore, according to the exterior member attaching method of the embodiment and the exterior member attaching device 11 of the embodiment, it is possible to prevent the electric wire from being crushed when being bonded to the exterior member.

Here, characteristics of the embodiment of the exterior member attaching method and the exterior member device according to the present invention will be simply described in each of the following descriptions.

The exterior member attaching method, including: the exterior member loading step of loading the sheet-shaped exterior member (19) onto the base plate (23) on which the plurality of electric wire regulation pins (15) are provided to freely advance and retreat in the direction along the electric wire (main line 31) in a state where the electric wire regulation pins (15) pass through exterior member holes (57); the electric wire loading step of placing the electric wire (main line 31) on the exterior member (19) along the electric wire regulation pins (15) which protrude from the exterior member (19); the exterior member temporary bonding step of nipping the electric wire (main line 31) by oscillating the movable temporary bonding portion (25) which is linked to the base plate (23) to be freely oscillated on the side opposite to the electric wire regulation pin (15) by nipping the electric wire (main line 31), and by temporarily bonding the second half (19b) of the exterior member (19) on the movable temporary bonding portion (25) while pushing the electric wire regulation pins (15) to the base plate (23) side, to the first half (19a) of the exterior member (19) on the base plate (23); and the exterior member actual bonding step of bonding the bonding end edge (77) using the bonding roller (27) which moves along the electric wire (main line 31) between the temporarily bonded exterior members (19).

The exterior member attaching method according to, in which, in the exterior member temporary bonding step, by moving the oscillating axis (41) of the movable temporary bonding portion (25), the second half (19b) of the exterior member (19) on the movable temporary bonding portion (25) is fed to the oscillation tip end side, and the bonding end edge (77) between the exterior members (19) is arranged.

The exterior member attaching device (11), including: a base plate (23) on which the first half (19a) of the sheet-shaped exterior member (19) is loaded in a state where the plurality of electric wire regulation pins (15) pass through the exterior member holes (57), on the base loading surface (13) on which the plurality of electric wire regulation pins (15) are provided to protrude to freely advance and retreat in a direction along the electric wire (main line 31); the movable temporary bonding portion (25) which stacks the exterior members (19) onto each other by being linked to the base plate (23) to be stackable by the oscillating axis (41), and nipping the electric wire (main line 31) which is loaded along the electric wire regulation pins (15) by the first half (19a) of the exterior member (19) on the base plate (23) and the second half (19b) of the exterior member (19) which is loaded onto the movable loading surface (63) while the second half (19b) of the exterior member (19) is loaded onto the movable loading surface (63) and pushes the electric wire regulation pins (15) by oscillation; and the bonding roller (27) which bonds the bonding end edge (77) along the electric wire (main line 31) between the exterior members (19) bonded by the base plate (23) and the movable temporary bonding portion (25).

The exterior member attaching device (11) according to, in which the oscillating axis (41) is supported to be freely movable in the direction which is orthogonal to the axial line to feed the second half (19b) of the exterior member (19) on the movable temporary bonding portion (25) to the oscillation tip end side.

According to the exterior member attaching method of the above-described configuration, the sheet-shaped exterior member is loaded across the base plate and the movable temporary bonding portion. When loading the exterior member, the electric wire regulation pins are inserted through the plurality of punched exterior member holes. When the electric wire is nipped and the movable temporary bonding portion which is positioned on a side opposite to the electric wire regulation pins is oscillated, the exterior member which is loaded onto the movable temporary bonding portion overlaps with the exterior member which is loaded onto the base plate. At this time, protrusion of the electric wire is regulated by movement or looseness in the electric wire regulation pins. Accordingly, the electric wire does not protrude to the bonding area of the exterior member. The bonding area where the electric wire does not protrude from the exterior member that temporarily bonds the electric wire is bonded by the bonding roller.

According to the exterior member attaching method of the above-described configuration, when the movable temporary bonding portion is oscillated, the oscillating axis of the movable temporary bonding portion is moved to the oscillation tip end side. The exterior member which is loaded onto the movable temporary bonding portion is moved to the oscillation tip end side as the oscillating axis moves. As a result, while being covered along an outer circumference of the electric wire, an extra length of the exterior member on a movable loading surface side of which the length to the bonding end edge is shortened is generated on the oscillation tip end side as the exterior member is fed to the oscillation tip end side. Accordingly, the bonding end edges between a base loading surface and the movable loading surface are arranged to match each other.

According to the exterior member attaching device of the above-described configuration, the movable temporary bonding portion is linked to the base plate to be freely oscillated by the oscillating axis. In other words, the movable loading surface of the movable temporary bonding portion is configured to match the base loading surface of the base plate. The plurality of electric wire regulation pins protrude to freely advance and retreat on the base loading surface. The electric wire regulation pins are inserted through the exterior member holes punched on the sheet-shaped exterior member. The electric wire is loaded onto the exterior member along these electric wire regulation pins. While being oscillated, the movable temporary bonding portion which nips the electric wire on a side opposite to the electric wire regulation pins pushes the electric wire regulation pins which protrude from the base loading surface to the base loading surface side. When pushing of the electric wire regulation pins is completed, at the same time, the exterior member on the movable loading surface is stacked on the exterior member on the base loading surface. Accordingly, the electric wire is guided by the electric wire regulation pins which are in the middle of being pushed right before being nipped by the exterior member, and the movement thereof is regulated. As a result, the electric wire does not protrude to the bonding area.

According to the exterior member attaching device of the above-described configuration, the movable temporary bonding portion is moved to the oscillation tip end side as the oscillating axis moves. While being covered along the outer circumference of the electric wire, the exterior member on the movable loading surface side of which the length to the bonding end edge is shortened is fed to the oscillation tip end side. Accordingly, the bonding end edge of the base loading surface and the bonding end edge of the movable loading surface are arranged to match each other.

According to the exterior member attaching method according to the present invention and the exterior member attaching device according to the present invention, it is possible to prevent the electric wire from being crushed when being bonded to the exterior member.

In addition, the exterior member attaching method and the exterior member attaching device according to the present invention are not limited to the above-described embodiment, and can be appropriately modified or improved. In addition to this, the quality of materials, the shape, the dimensions, the number, and the disposition locations of each constituent element in the above-described embodiment are arbitrary if the present invention can be realized, and are not limited to the description above.

The present invention is based on Japanese Patent Application (No. JP-2014-166784) filed on Aug. 19, 2014, the entire subject matter of which is incorporated herein by way of reference.

What is claimed is:
1. An exterior member attaching method, comprising:
an exterior member loading step of loading a sheet-shaped exterior member onto a base plate on which a plurality of electric wire regulation pins are provided to freely advance and retreat in a direction along an electric wire in a state where the electric wire regulation pins pass through exterior member holes;
an electric wire loading step of placing the electric wire on the exterior member along the electric wire regulation pins which protrude from the exterior member;
an exterior member temporary bonding step of nipping the electric wire by oscillating a movable temporary bonding portion which is linked to the base plate to be freely oscillated on a side opposite to the electric wire regulation pins by nipping the electric wire, and by temporarily bonding a second half of the exterior member on the movable temporary bonding portion to a first half of the exterior member on the base plate while pushing the electric wire regulation pins to the base plate side; and an exterior member actual bonding step of bonding a bonding end edge by moving a bonding roller along the electric wire between the temporarily bonded exterior members.

2. The exterior member attaching method according to the claim 1, wherein in the exterior member temporary bonding step, by moving an oscillating axis of the movable temporary bonding portion, the second half of the exterior member on the movable temporary bonding portion is fed to an oscillation tip end side, and the bonding end edge between the exterior members is arranged.

* * * * *